US012138961B2

(12) United States Patent
Schulte

(10) Patent No.: US 12,138,961 B2
(45) Date of Patent: Nov. 12, 2024

(54) CASTER FOR MOVABLE OBJECTS

(71) Applicant: Colson Rollen GMBH, Hückeswagen (DE)

(72) Inventor: Arnolf Schulte, Wermelskirchen (DE)

(73) Assignee: COLSON ROLLEN GMBH, Hückeswagen (DE)

(*) Notice: Subject to any disclaimer, the term of this patent is extended or adjusted under 35 U.S.C. 154(b) by 6 days.

(21) Appl. No.: 18/009,431

(22) PCT Filed: Jun. 7, 2021

(86) PCT No.: PCT/DE2021/100488
§ 371 (c)(1),
(2) Date: Dec. 9, 2022

(87) PCT Pub. No.: WO2022/002299
PCT Pub. Date: Jan. 6, 2022

(65) Prior Publication Data
US 2023/0219368 A1     Jul. 13, 2023

(30) Foreign Application Priority Data

Jun. 29, 2020 (DE) .................... 102020117031.9

(51) Int. Cl.
*B60B 33/00* (2006.01)
*B60B 33/02* (2006.01)

(52) U.S. Cl.
CPC ........ *B60B 33/021* (2013.01); *B60B 33/0078* (2013.01); *B60B 2200/24* (2013.01)

(58) Field of Classification Search
CPC ............ B60B 33/0028; B60B 33/0055; B60B 33/0094; B60B 33/0039; B60B 33/0049;
(Continued)

(56) References Cited

U.S. PATENT DOCUMENTS 3,911,525 A * 10/1975 Haussels ............... B60B 33/021
16/35 R
4,414,702 A    11/1983 Neumann
(Continued)

FOREIGN PATENT DOCUMENTS

CN         2176921 Y  *  9/1994
CN       101219630 B  *  6/2010
(Continued)

*Primary Examiner* — Chuck Y Mah
(74) *Attorney, Agent, or Firm* — Thompson Coburn LLP

(57) ABSTRACT

The invention relates to a caster for movable objects, and more particularly a bed caster, and at least comprises: a running wheel; a fork receiving said running wheel; a guide tube which is designed to be swivelable relative to the fork via at least one bearing; locking means provided on the fork side; and a braking system which can be brought into operative connection with the running wheel and is designed to block rotation of the wheels, characterised in that the braking system includes a brake shoe, a brake spindle, a guide pin and a cup-shaped guide element, wherein the brake spindle has groove-shaped guides, the cup-shaped guide element is provided with projections, and the projections can be brought into operative connection with the guides of the brake spindle in order to form the anti-rotation means.

8 Claims, 5 Drawing Sheets

(58) Field of Classification Search
CPC ............ B60B 33/0057; B60B 33/0068; B60B 33/0081; B60B 33/0084; B60B 33/0092; B60B 33/025; B60B 33/021; B60B 33/023; B60B 33/0042; B60B 33/0073; B60B 33/0078; B60B 33/0086; B60B 37/10; B60B 2200/222; B60B 2200/24; B60B 2200/242; B60B 2900/531; F16D 49/00; F16D 65/42; F16D 2121/14; F16D 2125/32

See application file for complete search history.

(56) References Cited

U.S. PATENT DOCUMENTS

| | | | | |
|---|---|---|---|---|
| 4,722,114 | A * | 2/1988 | Neumann | B60B 33/021 16/35 R |
| 5,303,450 | A | 4/1994 | Lange | |
| 5,503,416 | A * | 4/1996 | Aoki | B60B 33/021 378/198 |
| 5,774,936 | A * | 7/1998 | Vetter | B60B 33/021 16/35 R |
| 6,584,641 | B1 * | 7/2003 | Milbredt | B60B 33/0049 16/35 R |
| 7,182,178 | B2 * | 2/2007 | Chung | B60T 1/04 188/29 |
| 7,810,613 | B2 | 10/2010 | Lin | |
| 7,922,183 | B2 * | 4/2011 | Figel | A61G 1/0287 280/47.38 |
| 8,365,354 | B1 * | 2/2013 | Fan | B60B 33/04 16/35 R |
| 10,486,466 | B1 | 11/2019 | Yang | |
| 2012/0255141 | A1 * | 10/2012 | Lin | B60B 33/025 16/45 |
| 2014/0238784 | A1 | 8/2014 | Yeo | |
| 2017/0106696 | A1 * | 4/2017 | Schulte | B60B 33/025 |

FOREIGN PATENT DOCUMENTS

| | | | |
|---|---|---|---|
| CN | 207594641 U * | 7/2018 | |
| DE | 3119649 A1 | 12/1982 | |
| DE | 4137757 A1 | 5/1993 | |
| DE | 3602916 C2 | 7/1994 | |
| DE | 202006014765 U1 | 2/2008 | |
| DE | 102009043825 A1 * | 5/2010 | ......... B60B 33/0021 |
| DE | 102015013415 A1 | 4/2017 | |
| EP | 2422997 A1 * | 2/2012 | ......... B60B 33/0021 |
| FR | 2683770 A1 * | 5/1993 | ......... B60B 33/0023 |
| JP | 2009196380 A * | 9/2009 | |
| WO | 2013019001 A2 | 2/2013 | |

* cited by examiner

CASTER FOR MOVABLE OBJECTS

CROSS-REFERENCE TO RELATED APPLICATIONS

This application is a U.S. National Phase application of PCT/DE2021/100488, filed on Jun. 7, 2021, claiming the benefit of German Application No. 10 2020 117 031.9, filed on Jun. 29, 2020, both of which are incorporated herein by reference in their entireties.

The invention relates to a caster for movable objects, in particular, a bed caster according to the generic part of the first claim.

DE 10 2015 013 415 A1 reveals a caster for movable objects, in particular a bed caster, at least including a running wheel, the same receiving fork, a guide tube which is designed to be pivotable relative to the fork via at least one bearing, locking means provided on the fork side and a non-rotating braking system that can be brought into operative connection with the wheel, the braking system including an essentially cylindrical locking element, profiled on one side, which can be brought into operative connection with a polygonal locking element on the fork side to form the anti-rotation device.

The aim of the subject matter of the invention is to provide an alternative anti-rotation device that deviates from the state of the art and that is structurally simpler than the state of the art for casters of various types.

This goal is achieved in that the brake system includes a brake shoe, a brake spindle, a guide pin and a guide cup, the brake spindle having guides designed in the form of grooves, the guide cup being provided with lugs and the lugs are disposed and move within the guides of the brake spindle to form the anti-rotation device.

Advantageous developments of the subject matter of the invention are the referred to in the claims.

In contrast to the state of the art, an alternative anti-rotation device is thus provided which is simple in construction and can therefore be manufactured more inexpensively. The guide cup is preferably made of metal and, in the assembled state, is firmly connected to components of the bearing.

The guide cup is advantageously designed as a stamped and bent part.

Furthermore, it is proposed that the inner diameter of the guide cup is designed to be larger than the inner diameter of the bearing, and in particular, that the inner diameter of the lower portion of the guide cup is larger than the radial innermost portion of the inner ring of the bearing. The guide cup is firmly connected, and in particular riveted, to the inner ring of the bearing.

The brake spindle should encircle the guide pin.

According to a further aspect of the invention, the mutually facing end faces of the brake shoe and the brake spindle are provided with teeth. The teeth of the two interlock when the caster is braked.

In any position of the caster (braked or unbraked), the lugs of the guide cup remain in the groove-like guides of the brake spindle, so that the anti-rotation protection is guaranteed in every operating state of the caster.

In addition, the guide pin should be positioned within the guide tube and be movable in the axial direction via an eccentric provided in the area of the guide tube, in order to be able to implement different operating states of the caster.

The subject matter of the invention is shown in the drawing using an exemplary embodiment and is described as follows. The drawings are as follows:

FIG. 1 schematic sketch of a caster designed as a bed caster in different views;

Figure 1:
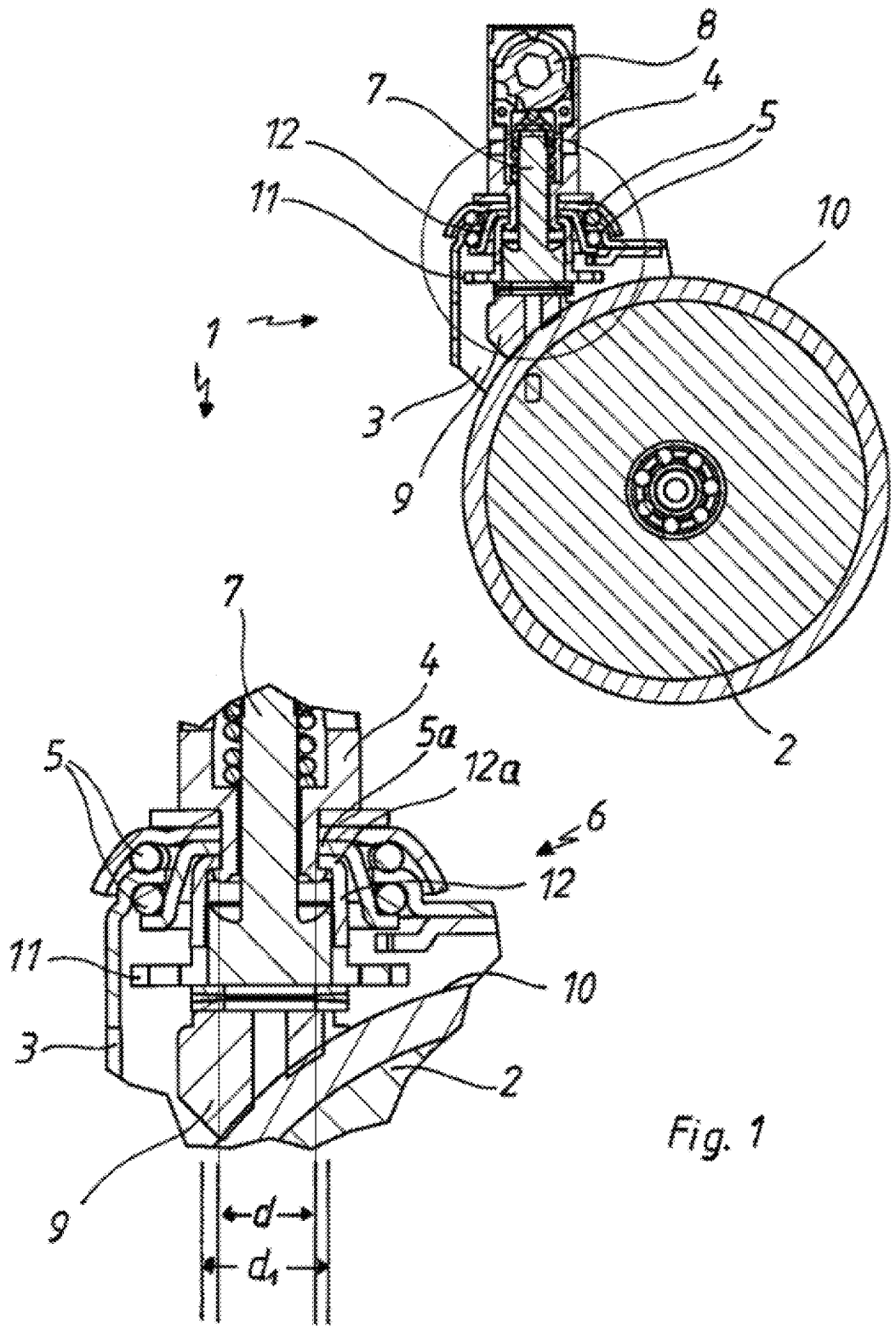
Figure 4:
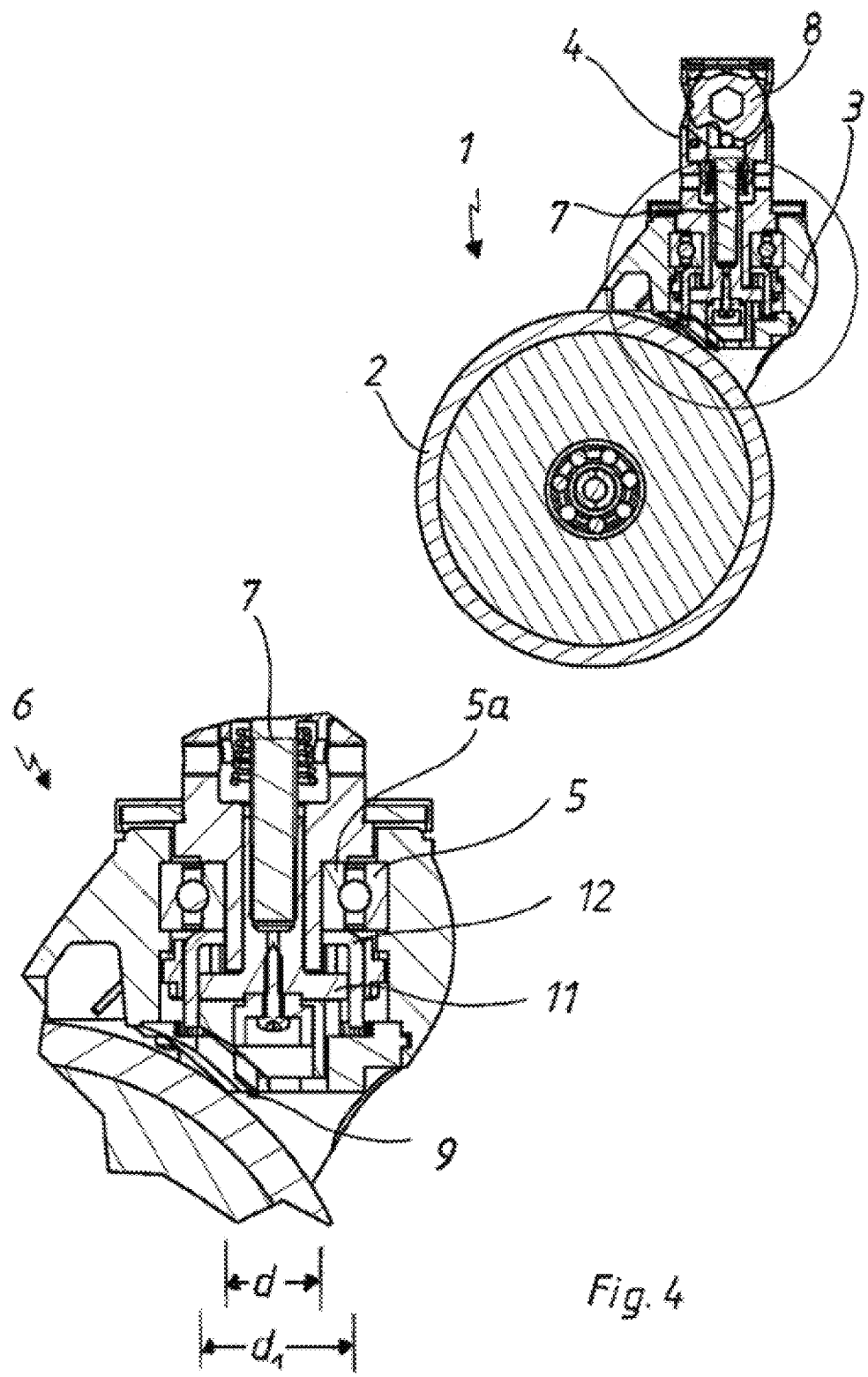
Figure 5:
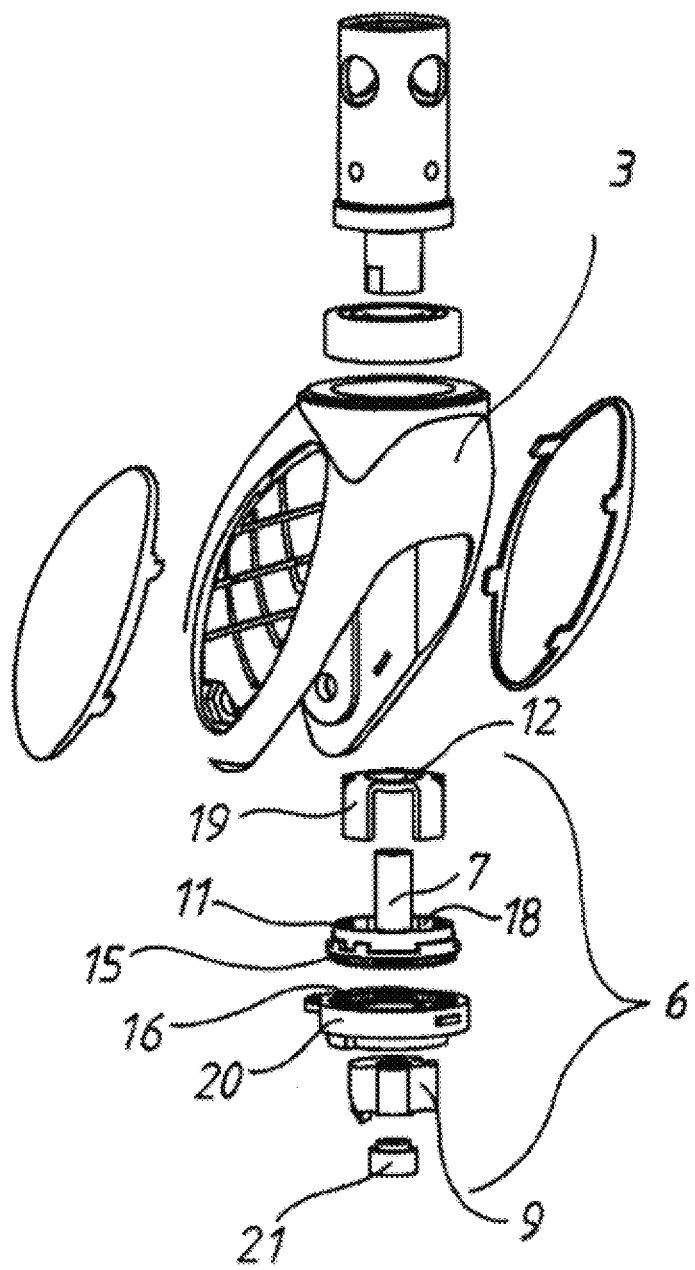

FIG. 4 alternative representation of the caster according to FIG. 1;

FIG. 5 shows the individual parts of the braking system according to FIG. 4.

FIG. 1 shows a basic sketch of a caster 1 designed as a bed caster in different views or sections. The caster contains an wheel 2, a fork 3 that receives the same, a guide tube 4 which is pivotably connected to the fork 3 via at least one bearing 5. On the fork side, there is a braking system 6 designed to be secured against rotation, which is described in more detail in FIG. 2. A guide pin 7 can be seen in FIG. 1, which is in operative connection with an eccentric 8 in the upper region of the guide tube 4. The following components can also be seen: a brake shoe 9, which can be brought into operative connection with the outer circumferential surface 10 of the wheel 2, a brake spindle 11 and a guide cup 12 designed as a metal part. The upper end surface 12a of the guide cup is firmly connected to the inner ring 5a of the bearing 5, and in particular riveted. The inner diameter di of the lower end of the guide cup 12 is larger than the radial innermost portion of the inner diameter surface d of the bearing inner ring 5a.

Figure 2:
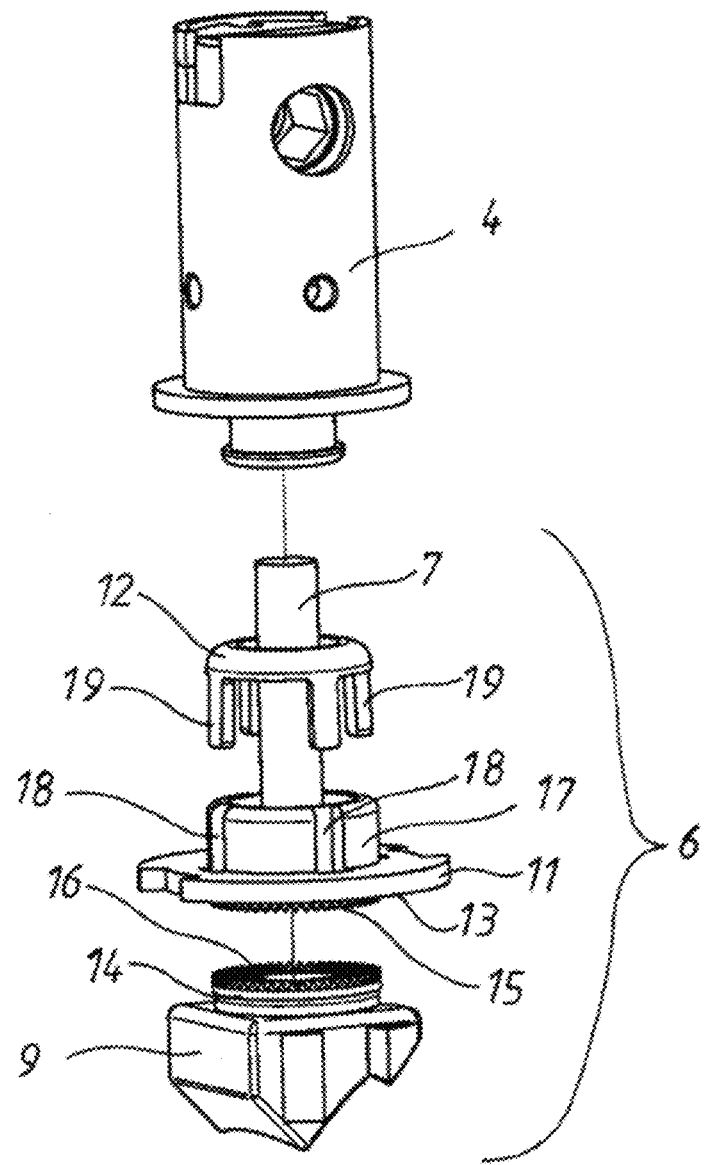
FIG. 2 shows the individual parts of the anti-rotation device of the caster according to FIG. 1.

FIG. 2 shows the individual components of the anti-rotation device of the brake system 6. The guide pin 7, which is guided within the guide tube 4, can be seen. The brake shoe 9, the brake spindle 11 and the guide cup 12 are also shown. In the upper region 17 of the brake spindle 11 facing the guide cup 12, groove-shaped guides 18 are provided. Lugs 19 pointing in the direction of the upper region 17 are integrally formed on the guide cup 12 and engage in the guides 18 of the brake spindle 11 to form the anti-rotation device of the brake system 6. The guide cup 12 is designed as a cylindrical metal part. In the assembled state, the lugs 19 of the guide cup 12 engage in the groove-like guides 18 of the brake spindle 11 in every operating state of the caster 1.

Figure 3:
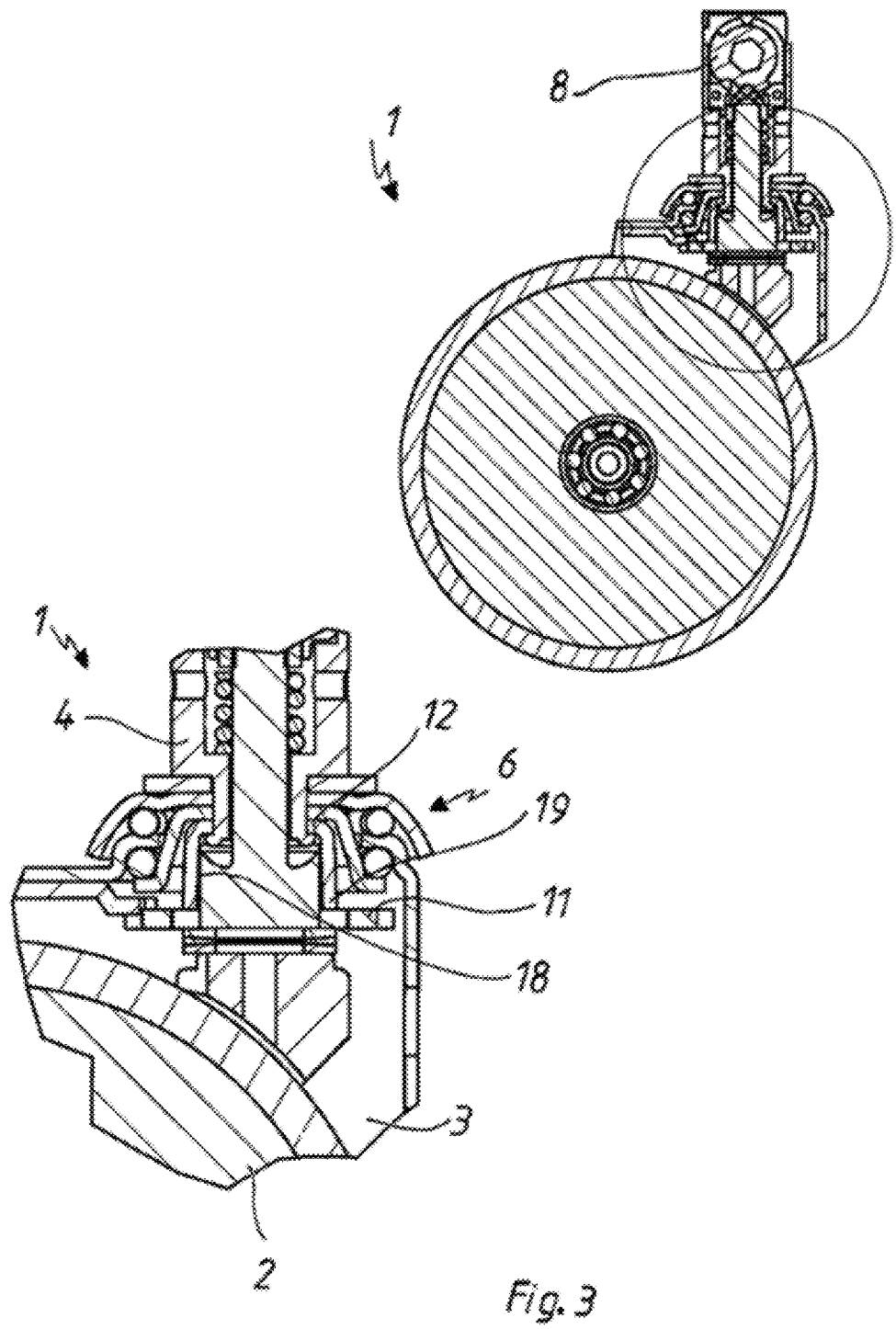
FIG. 3 shows the braking system in different views or sections.

FIG. 3 shows the caster 1 according to FIG. 1 with a braking the brake system 6 in the uppermost position. The lugs 19 of the guide cup 12 rest in the guides 18 of the brake spindle 11, with the lugs 19 in a higher position in the guides 18 in FIG. 1 and with the lugs 19 in a lower position in the guides 18 in FIG. 3, and with the lugs 19 in the lowest position in the guides 18 in FIG. 4. By actuating the eccentric 8, operating states of the caster 1, such as braked, unbraked or pivotable, can be brought about. In FIG. 3, the operating state shown is that the fork 3 and thus the wheel 2 can be pivoted relative to the guide tube 4.

FIGS. 4 to 6 show alternative basic sketches of a roll 1 designed as a bed roll in different views and sections.

The same components are denoted by the same reference symbols as in FIGS. 1 to 3. The caster 1, the wheel 2, the fork 3, and the guide tube 4, and a differently designed bearing 5 can be seen. Furthermore, the brake system 6, the guide pin 7, the eccentric 8, the brake shoe 9, the brake spindle 11, the guide cup 12 can also be seen. In analogy to FIG. 1, the inner diameter di of the guide cup 12 is also here larger than the inner diameter d of the bearing inner ring 5a of the bearing 5.

FIG. 5 shows the individual components of the structural design of the caster 1. The braking system 6 is shown in analogy to FIG. 2. The following components can be seen: the guide cup 12, the lugs 19 formed on the guide cup 12, the guide pin 7, the brake spindle 11 together with the groove-like guides 18 and the fork 3.

The brake shoe 9, a brake shoe holder 20 and a lifting cup 21 can also be seen. If there are changes in the operating status of the caster or the brake system 6, the lifting cup 21 actuates the brake shoe 9. In particular, referring to FIG. 4, the brake shoe 9 is supported within the fork 3 in a position to contact the running wheel 2 when the brake system is locked. As the eccentric 8 is positioned, the brake spindle 11 and the guide pin 7 move, which in turn moves the lifting cup 21 move into and out of contact with the brake shoe 9, which in turns moves the brake shoe 9 into and out of contact with the running wheel 2. In a similar fashion, in FIGS. 1-3, the brake shoe 9 is supported within the fork 3 in a position to contact the running wheel 2 when the brake system is locked. As the eccentric 8 is positioned, the brake spindle 11 and the guide pin 7 move into and out of contact with the brake shoe 9, which in turns moves the brake shoe 9 into and out of contact with the running wheel 2. The brake spindle 11 is provided with teeth 15 extending in the axial direction. The same applies to the brake shoe holder 20, the teeth being indicated by the reference number 16. In the operating state, the teeth 15,16 mesh with one another, the teeth 15 being movable in the axial direction relative to the teeth 16.

LIST OF REFERENCE SYMBOLS

1 caster
2 wheel
3 fork
4 guide tube
5 bearings
5a bearing inner ring
6 braking system
7 guide pin
8 eccentric
9 brake shoe
10 circumferential area
11 brake spindle
12 guide cup
12a end face of guide duo
13 end face
14 end face
15 teeth
16 teeth
17 Upper area of the brake spindle
18 Brake spindle guide
19 bosses
20 brake shoe holder
21 Lifting cup
d diameter of inner bearing ring
di diameter of guide cup

The invention claimed is:

1. A caster for movable objects, the caster comprising at least a running wheel, a fork for receiving the running wheel, a guide tube adapted and configured to be pivotable relative to the fork via at least one bearing about a swivel axis, the bearing having an outer ring and an inner ring, the outer ring of the bearing being operatively connected with the fork a lock provided on the fork, and a brake system being adapted and configured to be brought into and out of operative connection with the running wheel to lock and unlock the running wheel characterized in that the brake system comprises a brake shoe, a brake spindle, a guide pin and a guide cup, the brake spindle having guides comprising grooves, the guide cup being provided with lugs, the lugs being disposed and movable within the guides of the brake spindle, the guide cup being integral with the inner ring of the bearing, the brake spindle having a lower surface with teeth, the brake shoe being operatively connected with the fork, the brake shoe having an upper surface with teeth, the teeth of the lower surface of the brake spindle and the teeth of the upper surface of the brake shoe being adapted and configured for engagement and disengagement when the brake system is respectively locked and unlocked, the lugs of the guide cup remaining in the guides of the brake spindle when the brake system is locked and unlocked in order to prevent rotation of the brake system about the swivel axis of the caster.

2. The caster according to claim 1, characterized in that the guide cup is made of metal.

3. The caster according to claim 1, characterized in that the guide cup is a stamped part.

4. The caster according to claim 1, characterized in that an inner diameter (di) of a lower portion of the guide cup is larger than an inner diameter (d) of a radially innermost portion of an inner ring of the bearing.

5. The caster according to claim 1, characterized in that the brake spindle encircles the guide pin.

6. The caster according to claim 1, characterized in that the guide pin is movably positionable within the guide tube.

7. The caster according to claim 1 characterized in that the guide cup is riveted to the bearing.

8. The caster according to claim 1 wherein wherein the guide pin is axially movable within the guide tube to facilitate the transition of the brake system between being locked and unlocked.

\* \* \* \* \*